United States Patent [19]

McCambridge et al.

[11] Patent Number: 5,565,887

[45] Date of Patent: Oct. 15, 1996

[54] METHOD AND APPARATUS FOR MOVING A CURSOR ON A COMPUTER SCREEN

[75] Inventors: Lora K. McCambridge, Bellevue; James A. Andrews, Issaquah; Carl T. Hellings, Bellevue; Eric W. Hanson, Kent; Jon B. Kimmich; Timothy T. Brewer, both of Bellevue; Michael W. Van Flandern; Paul E. Henderson, Jr., both of Redmond, all of Wash.

[73] Assignee: Microsoft Corporation, Redmond, Wash.

[21] Appl. No.: 268,146

[22] Filed: Jun. 29, 1994

[51] Int. Cl.⁶ .................................................. G09G 5/08
[52] U.S. Cl. ........................................... 345/145; 345/157
[58] Field of Search ..................................... 345/145, 146, 345/157, 160, 163, 167, 155, 158

[56] References Cited

U.S. PATENT DOCUMENTS

| | | | |
|---|---|---|---|
| 5,195,179 | 3/1993 | Tokunaga | 345/145 |
| 5,263,134 | 11/1993 | Paal et al. | 395/158 |
| 5,398,044 | 3/1995 | Hill | 345/145 |

OTHER PUBLICATIONS

Crawford, Dale K., and Lana K. Bryan, *Designer Reference Guide*, Micrografx, Inc., Texas, 1990, pp. 1–10–1–11.
Microsoft Draw User's Guide, Version 1.0, Microsoft Corporation, Washington, 1991, p. 21.

*Primary Examiner*—Steven Saras
*Attorney, Agent, or Firm*—Seed and Berry LLP

[57] ABSTRACT

A routine allows a user to move a cursor in only mutually perpendicular, horizontal or vertical directions on a computer screen, despite erratic or wavy movement of a pointing device. The routine, once enabled, receives mouse movement signals produced when the user moves the pointing device, the mouse movement signals having x and y position components. The routine uses the greater of the change in the x and y components to initially move the cursor in either horizontal or vertical directions, respectively. The routine continues to move the cursor along the initially established direction, even if the change in mouse movement signals in the other perpendicular direction become greater during continued mouse movement. Only when the change in mouse movement signals in the perpendicular direction become much greater (e.g., ten times greater) will the routine switch to moving the cursor along the perpendicular direction.

18 Claims, 5 Drawing Sheets

METHOD AND APPARATUS FOR MOVING A CURSOR ON A COMPUTER SCREEN

TECHNICAL FIELD

The present invention relates to moving a cursor or other displayed object on a visual display device such as a computer screen.

BACKGROUND OF THE INVENTION

As is known in the art, a cursor on a computer screen can be used to input commands into a computer. The cursor contains a hot point that indicates the location of the cursor itself. A user can input commands to move the cursor on the screen, thus moving the hot point, by using keyboard arrow keys or a pointing device such as a mouse or trackball.

By moving the cursor and placing the hot point on a particular portion of the screen, commands can be entered into the computer. For example, a computer may have a software program which includes pull-down menus. By placing the hot point of the cursor on a pull-down menu and actuating or "clicking" a switch or button, a menu is displayed on the screen from which a user may enter commands. Similarly, by placing the hot point of the cursor on an icon, file name, menu selection, or other object on the screen and clicking the button, a command can be entered to open or act upon a file or application program that is represented by the icon, file name, menu selection or other object. This method of command selection is commonly known as "point and click," and is commonly performed using computer pointing devices such as mice or trackballs. Overall, the point and click method of command selection allows users to more easily operate computers.

Often, pull-down menu selections are placed in a menu bar in a narrow horizontal row across the screen. If a user wishes to move from one menu selection to another, the user must navigate the hot point of the cursor horizontally within this row. Once the user navigates the cursor to the desired menu selection, a list of options is often displayed in a column running vertically on the computer screen. A user must then navigate the hot point of the cursor through this column if the user wishes to move from option to option. Often, many users, including young and handicapped users, have difficulty in navigating the cursor within narrow rows or columns on the screen. These users often move the mouse or ball of the trackball unevenly, causing the cursor to move waveringly or along arcuate or diagonal paths.

In certain software applications, users desire to move a cursor continuously along horizontal and vertical paths. For example, in a large spreadsheet, a user may wish to move a cursor horizontally along a given row or vertically through a given column, without moving the cursor into adjacent rows or columns. In many drawing or painting programs, a user will often wish to draw straight horizontal or vertical lines, thus requiring the cursor to move along straight horizontal and vertical paths. Overall, many users have difficulty navigating a cursor continuously along straight horizontal or vertical paths, even though such cursor movement is desirable.

SUMMARY OF THE INVENTION

According to principles of the present invention, a method restricts movement of a cursor on a computer screen in response to movement signals. The movement signals have coordinates corresponding to a position with respect to x and y axes. The method includes the steps of: (i) storing a first position of the cursor on the computer screen, the first position having first and second coordinates corresponding to a position with respect to the x and y axes, respectively; (ii) storing a previous direction which the cursor has moved on the computer screen; (iii) receiving a movement signal having third and fourth coordinates corresponding to positions with respect to the x and y axes, respectively; (iv) comparing the first and third coordinates to produce a first value, and the second and fourth components to produce a second value; (v) linearly moving the cursor along the first axis if the first value is greater than a factor multiplied by the second value; (vi) linearly moving the cursor along the second axis if the second value is greater than the factor multiplied by the first value; and (vii) linearly moving the cursor in another direction only if the first value is not greater than the factor multiplied by the second value or the second value is not greater than the factor multiplied by the first value.

DETAILED DESCRIPTION OF THE PRESENTLY PREFERRED EMBODIMENT

As described more fully below, the present invention allows a user to move a cursor in only mutually perpendicular, horizontal or vertical directions on a computer screen, despite erratic or wavy movement of a pointing device. The routine, once enabled, receives mouse movement signals produced when the user moves the pointing device, the mouse movement signals having x and y axis direction components. The routine uses the greater of the change in the x and y components to initially move the cursor in either horizontal or vertical directions, respectively. The routine continues to move the cursor in a straight path along the initially established direction, even if the user moves the cursor slightly in another direction, thus changing the components in the mouse movement signal corresponding to the other direction. Furthermore, the routine will continue to move the cursor in the initial direction even if the components in the mouse movement signal corresponding to the other direction become greater than the components in the initial direction as the user continues to move the mouse. Only when the change in the components corresponding to the perpendicular direction become much greater (e.g., ten times greater), will the routine switch to moving the cursor along the perpendicular direction.

Figure 1:
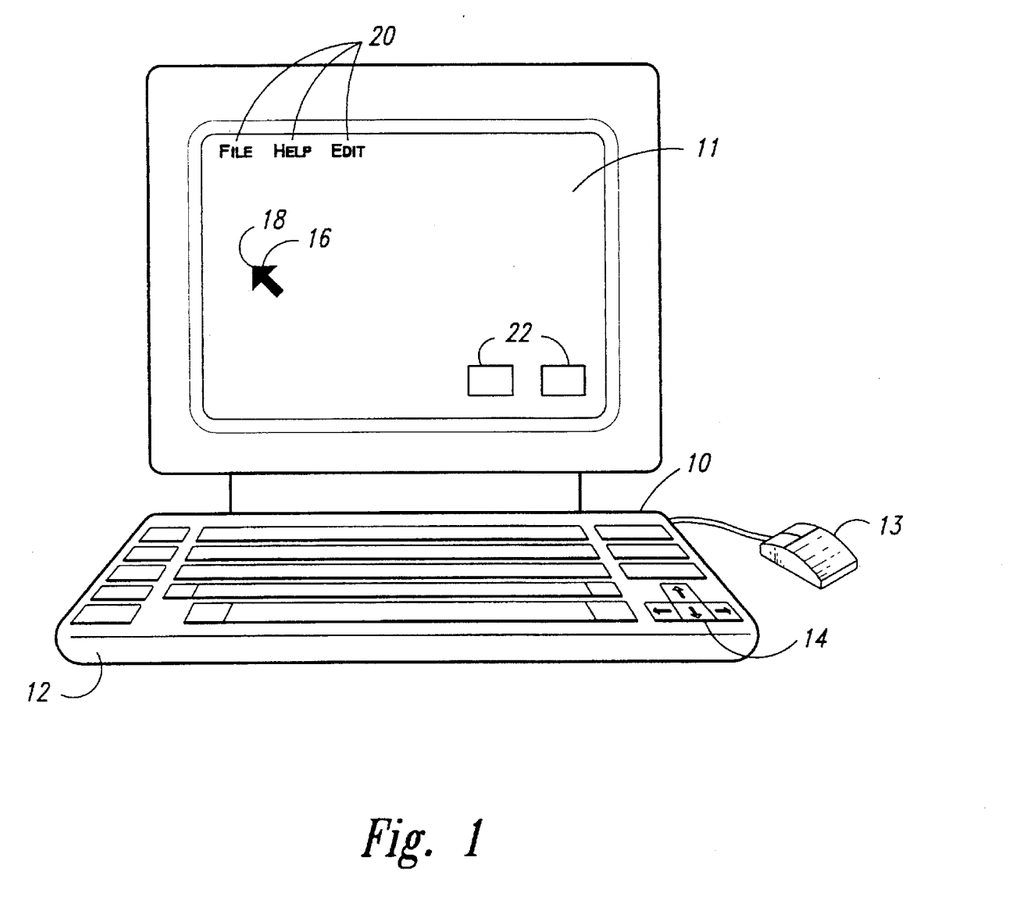
FIG. 1 is an isometric view of a computer showing a cursor displayed on a computer screen.

FIG. 1 illustrates a computer 10 having a visual display device or screen 11, a keyboard 12, and a mouse 13 or any other type of pointing device, such as a trackball, all of which are coupled to the computer. The computer 10 includes a central processing unit ("CPU"), memory and other hardware and software features (not shown) that are associated with most currently available computers. The keyboard 12 includes cursor movement keys 14 that provide signals to the computer 10 for moving a cursor 16 displayed on the screen 11. Similarly, the mouse 13 provides commands to the computer 10, including commands for moving the cursor 16 on the screen 11. While the cursor movement keys 14 may generally provide signals to move the cursor 16 along only horizontal or vertical directions, the mouse 13 provides commands to freely move the cursor on the screen 11.

The computer 10 converts commands from the mouse 13 into cursor :movement messages or signals. Each mouse movement signal includes components or x and y position coordinates that indicates a position to which the cursor 16 is to be moved on the screen 11 based on movement of the mouse 13. The computer 10, under the direction of converter means or an operating system running on the computer, such as the MICROSOFT® WINDOWS™ operating system manufactured by Microsoft Corporation, converts the mouse movement signals into movement of the cursor on the screen 11. Mouse movement signals are typically generated at a rate of 60 signals per second.

The cursor 16, shown on the screen 11, includes a hot point 18. The hot point 18 is the active portion of the cursor 16 for entering commands into the computer 10. The screen 11 shows several pull-down menus 20 and icons 22 upon which the user may place the hot point 18 of the cursor 16 and enter commands into the computer 10. While the cursor 16 is shown as an arrow and the hot point 18 as the point of the arrow, various other types of cursors particular to a given computer software application may be employed. For example, in a given drawing application, the cursor 16 may take the shape of a pencil, and the hot point 18 may be the point of the pencil.

Figure 2A:
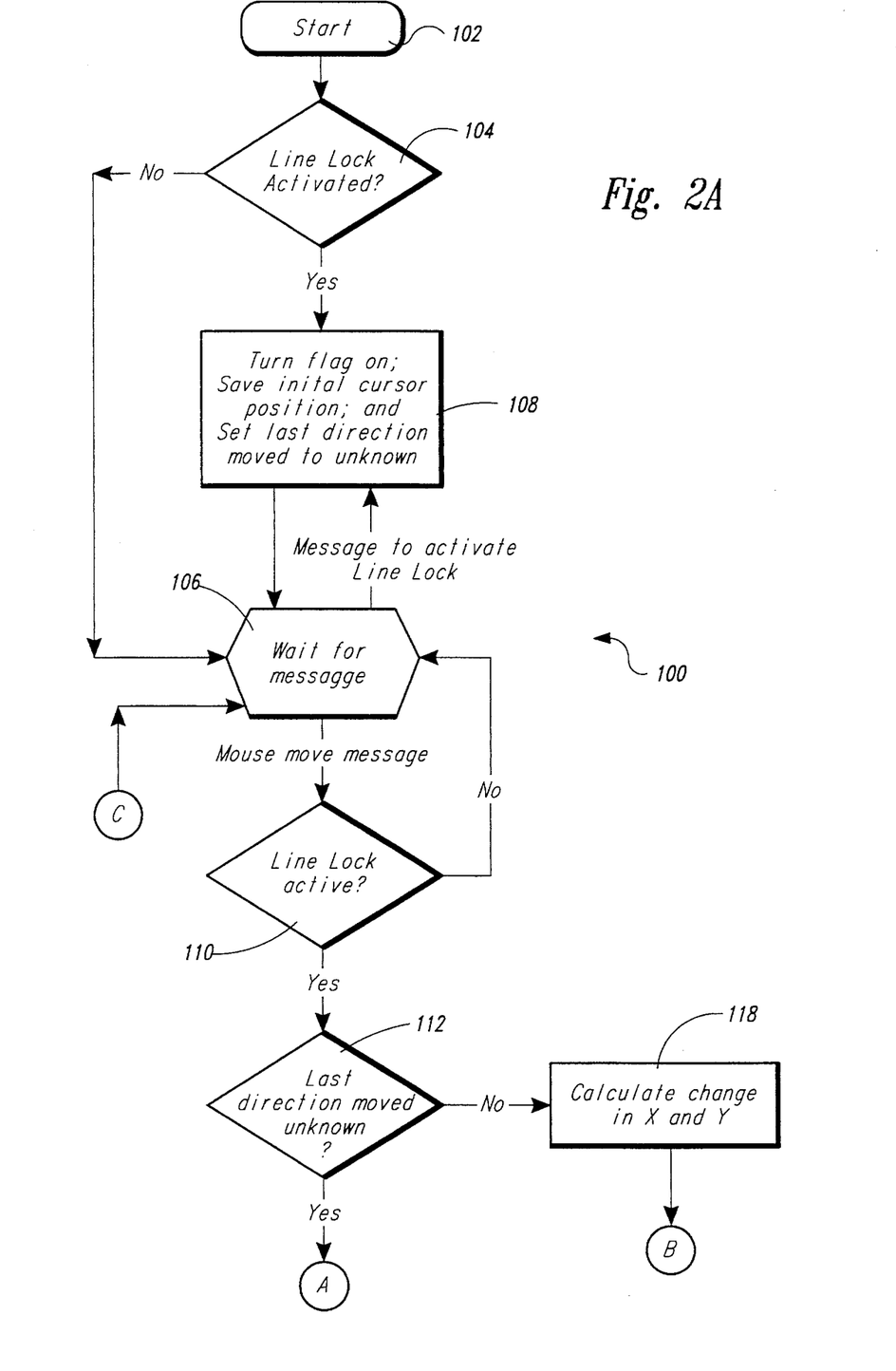
FIGS. 2A and 2B are flowcharts illustrating a method according to general principles of the present invention.
Figure 2B:
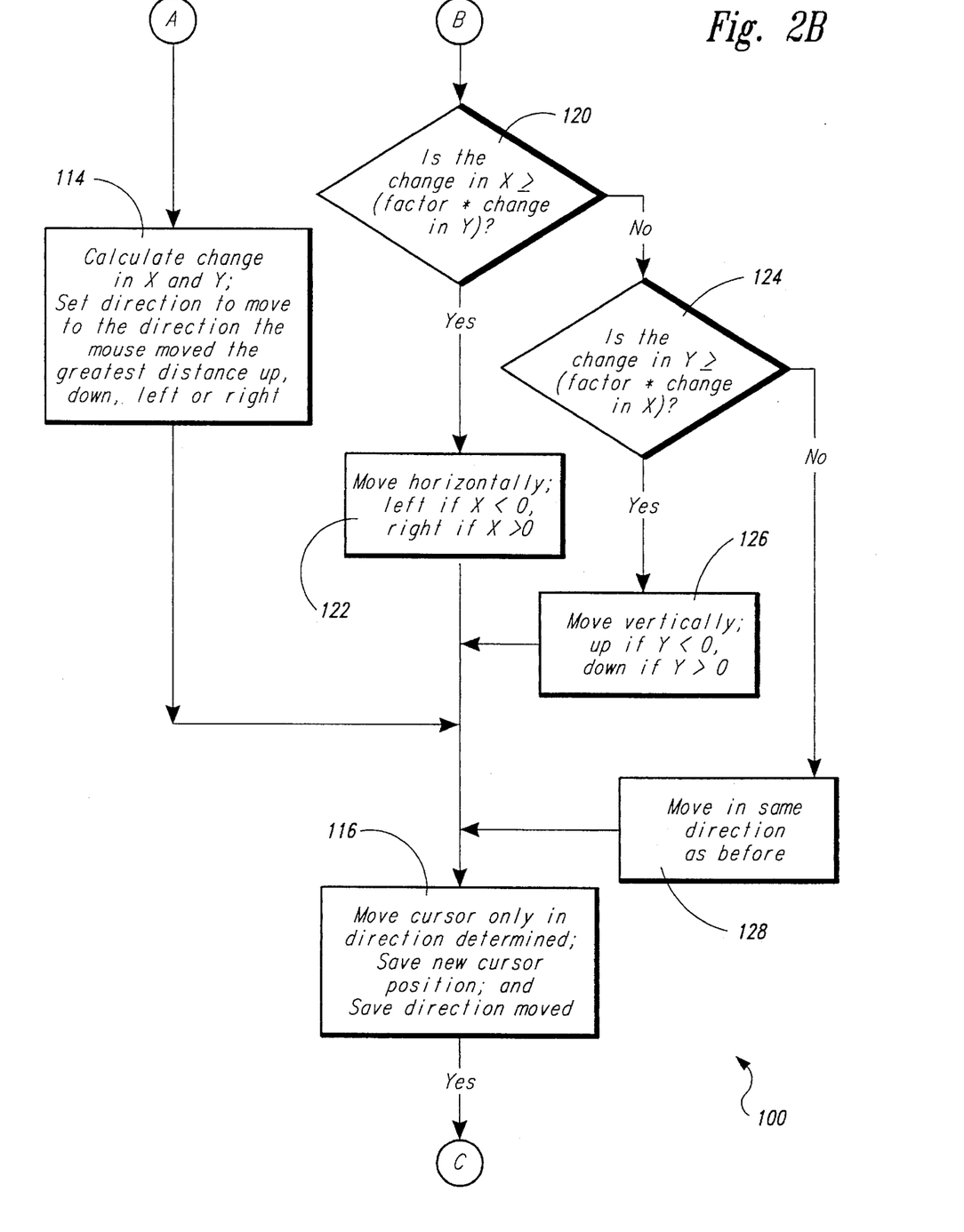

FIGS. 2A and 2B are flowchart diagrams illustrating the main steps carried out under a routine 100 of the present invention for performing a "Line Lock" function that causes the cursor 16 to selectively move in only straight horizontal or vertical directions on the screen 11, essentially ignoring or filtering any change in direction of the cursor from the selected direction. The routine 100 preferably runs in connection with the operating system running on the computer 10 and receives mouse movement signals at interrupt intervals, e.g., at the rate of about 60 mouse movement signals per second. The routine 100 preferably starts in step 102 during initiation or startup of the operating system running on the computer 10. Alternatively, the routine 100 could start in step 102 by means of another routine in the computer 10 that controls operation of the mouse 13, such as a mouse manager or control program. Furthermore, the routine 100 could start in step 102 by means of selection of an appropriate menu option displayed on the screen 11, such as an option provided by a pull-down menu or a toolbar.

In step 104, the computer 10 determines if the Line Lock function of the routine 100 has been activated, and if not, the routine 100 proceeds to step 106 where the computer waits for a message. While the routine 100 may be automatically initiated when the computer 10 boots up and loads its operating system software, the Line Lock function of the routine 100 is user-selectable. A user may activate the Line Lock function by selecting an appropriate check box option in the mouse manager program or from a button in a toolbar in a particular software application. When the computer 10 receives such a command message to initiate the Line Lock function in step 106, or if the Line Lock function has previously been activated before step 104, the routine 100 proceeds to step 108.

When the computer 10 generates mouse movement signals, these signals are passed to the routine 100 during step 106. Upon receipt of mouse movement signals in step 106, the routine 100 proceeds to step 110 where the computer 10 determines if the Line Lock function is active. If the Line Lock function is not active, the routine 100 loops back to step 106 to wait for the user to activate the Line Lock function as noted above.

In step 108, the computer 10 has received the command to activate the Line Lock function and therefore the computer turns on a flag, stores a current position of the cursor 16 as an initial position in memory, and sets a last direction to which the cursor has been moved to unknown. The flag indicates the status of the Line Lock function; if the flag is on, the Line Lock function is activated, and if the flag is off, the Line Lock function is not activated. After step 108, the routine 100 proceeds to step 106 to await mouse movement signals or messages.

The computer 10, under the routine 100, determines whether the Line Lock function is active in step 110 by checking the status of the flag, and if the function is activated, then the computer proceeds to step 112 where it determines if the direction last moved by the cursor 16 is unknown. If the Line Lock function had just recently been activated, and thus the last direction in which the cursor 16 has moved is unknown, then in step 114, the computer 10 sets the direction in which the cursor is to move by comparing the initial cursor position stored in step 108 to a current position of the cursor, as indicated by a recently received mouse movement signal. The user will generate the recently received mouse movement signal by moving the mouse 13 in an initially desired or selected direction after having initiated the Line Lock function in step 108. In step 114, the computer 10 determines the change in position, preferably in pixels, of the cursor 16 along the x axis by subtracting the current x position coordinate in the recently received mouse movement signal from the previous x position coordinate stored in step 108, and then taking the absolute value of the result. Similarly, the computer 10 determines the change in position of the cursor 16 along the y axis by subtracting the current y position coordinate in the recently received mouse movement signal from the previous y position coordinate stored in step 108, and then taking the absolute value of the result.

Thereafter, the computer 10 under step 114 limits movement of the cursor 16 to movement along only straight lines parallel to the axis selected by the user when the Line Lock function was activated under step 108. The computer 10 selects (i) the sole axis along which the cursor 16 is to move to be the axis that has the greatest calculated change in position, and (ii)the direction along that axis depending upon whether the calculated change in position along the selected axis is positive or :negative (i.e., the computer sets the direction to be either up, down, left or right along axes y, −y, −x, or x, respectively). If the changes in the x and y direction are equal, the routine 100 defaults to move the cursor 16 horizontally in the x direction (to the left if the change in the x direction is negative, and to the right if the change is positive).

In step 116, the computer 10 (i)moves the cursor 16 on the screen 11 in only the horizontal or vertical direction set in step 114, for a distance, in pixels, equal to the previously calculated change in position in that direction, (ii) saves the new position of the cursor, and (iii) saves the direction in which the cursor has moved. In a first example, if the initial cursor position stored in step 108 has the Cartesian coordinates (70, 90) and the current cursor position has the coordinates (80, 95), then the change in the x direction is ten pixels, while the change in the y direction is only five pixels. The absolute value of the changes in the x and y directions is also 10 and 5, respectively. Thus, in step 114, the computer 10 determines that the greatest change in distance over which the cursor 16 is to be moved on the screen 11 is along the x axis, and the direction in which the cursor is to be moved is rightward since the change is positive. The computer 10, in step 116, ignores or filters any change in the coordinates for the y axis as it moves the cursor 16, and thus ignores any change in the y direction in this example. In this first example, the computer 10 moves the cursor 16 ten pixels rightward along a straight line parallel to the x axis from the cursor's current position in step 116. After moving the cursor 16, the computer 10 saves the new position of the cursor (i.e., (80, 90)) and the direction in which the cursor moved (i.e., rightward) under step 116.

In a second example, if the initial position of the cursor has the coordinates (70, 90) and the current position of the cursor is to be (65, 80), the change in the x direction is −5, while the change in the y direction is −10. The absolute value of the changes in the x and y direction are 5 and 10, respectively. Thus, in step 114, the computer 10 determines that the greatest change in distance over which the cursor 16 is to be moved on the screen 11 is along the y axis; and the direction is upward since the change is negative. In this second example, the computer 10 moves the cursor 16 ten pixels up along a straight line parallel to the y axis from the cursor's current position in step 116, ignoring the change in the x direction. After moving the cursor 16, the computer 10 saves the new position of the cursor (i.e., (70, 80)) and the direction in which the cursor moved (i.e., upward).

Following step 116, the routine 100 loops back to step 106 where the computer 10 waits for additional mouse movement signals. After receiving a new mouse movement signal, indicating a new position to which the cursor 16 is to be moved based on the user's movement of the mouse 13, the routine determines that the Line Lock function is active in step 110, and that the last direction moved is not unknown in step 112. The computer 10 next calculates the change in x and y directions in step 118. As explained above with respect to step 114, the computer 10 in step 118 calculates the change in cursor position by comparing the absolute value of the change in the x and y position coordinates between the cursor coordinates in the new mouse movement signal and the cursor coordinates previously stored in step 116.

In step 120, the computer 10 compares the absolute value of the change in the x direction to the absolute value of the change in the y direction multiplied by a selected factor. The selected factor is preferably a large value, such as ten mickeys or pixels. If the absolute value of the change in the x direction computed in step 118 is greater than or equal to ten times the absolute value of the change in the y direction in step 120, then in step 122, the computer 10 determines that the cursor 16 is to be moved horizontally (i.e., parallel to the x axis). If the change in the x direction is less than zero, then the cursor 16 is to be moved to the left, and if the change in the x direction is greater than zero, the cursor is to be moved to the right. Thereafter, in step 116, the computer 10 moves the cursor 16 in a straight line left or right by a number of pixels equal to the absolute value of the change in the x direction. The new position of the cursor 16 and the direction in which the cursor moved is also stored in step 116.

If the absolute value of the change in the x direction is less than the selected factor multiplied by the absolute value of the change in the y direction, then in step 124, the computer 10 determines if the absolute value of the change in the y direction is greater than or equal to the factor multiplied by the absolute value of the change in the x direction. If it is, then in step 126, the computer 10 determines that the cursor 216 is to be moved vertically (i.e., parallel to the y axis): upward if the change in the y direction is less than zero, and downward if the change in the y direction is greater than zero. Following step 126, the computer 10 moves the cursor 16 in a straight line vertically up or down in step 116 by a number of pixels equal to the absolute value of the change in the y direction, and the new position of the cursor and the direction in which the cursor moved are stored.

If the computer 10 determines in step 124 that the absolute value of the change in y is less than the factor times the absolute value of the change in x, then in step 128, the computer 10 determines that the cursor 16 is to be moved in the same direction as previously saved in step 116. The direction in which the cursor 16 is moved in this same direction is determined by the change in x or y directions. Following steps 122, 126 or 128, the computer 10 moves the cursor 16 in step 116, saves the new position of the cursor and the direction in which the cursor moved, and then loops back to step 106.

As an example of the steps 122 through 128, if the coordinates of the previous cursor position are (70, 90) and the current cursor position coordinates are (65, 80), and the previous direction in which the cursor 16 moved was leftward or in the −x direction, then the absolute value of the change in the x or y direction is less than ten times the absolute value of the change in the y or x direction, respectively. Therefore, the routine 100 proceeds through steps 120 and 124, to step 128, and moves the cursor in step 116 five pixels to the left, even though the change in the y direction is greater than the change in the x direction. However, if the current position coordinates are instead (65, 140), then the change in the x direction is still −5, while the change in the y direction is 50, which is equal to ten times the change in the x direction. Therefore, in step 124, the computer 10 determines that the absolute value of the change in the y direction is greater than or equal to ten times the absolute value of the change in the x direction. Thereafter, in step 126, the computer 10 determines that the cursor 16 is to be moved vertically, and downward, since the change in the y direction is positive.

Figure 3:
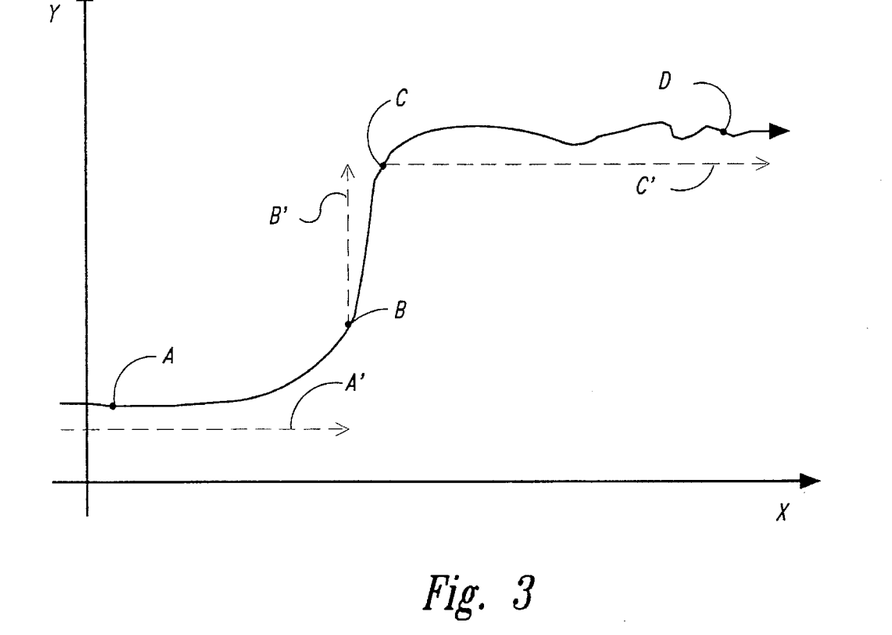
FIG. 3 shows an example of movement of a mouse along x and y axes to produce movement of a cursor on the computer screen under the present invention.
Figure 4:
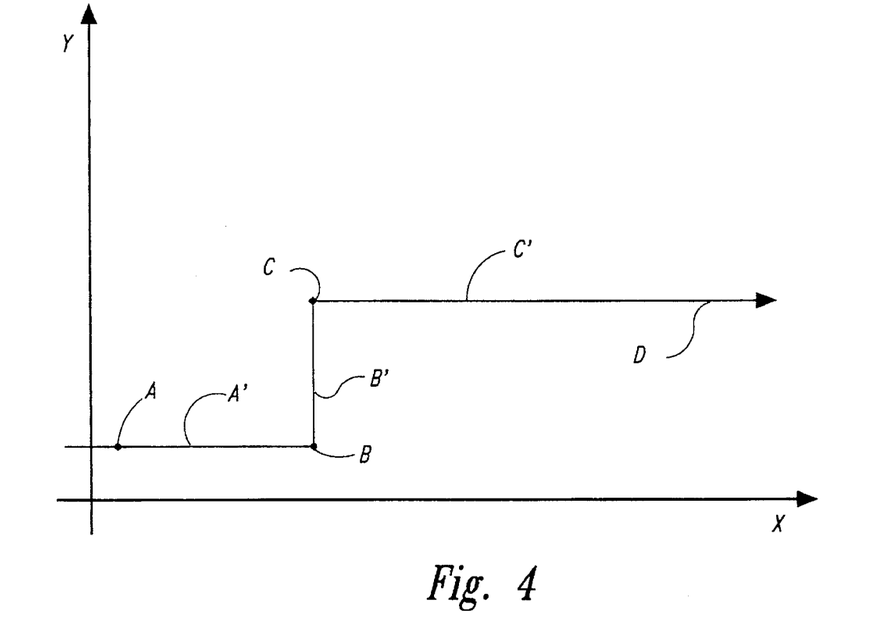
FIG. 4 shows movement of the cursor on the computer screen using the inventive method of FIGS. 2A and 2B in response to the mouse movement of FIG. 3.

FIGS. 3 and 4 show how movement of the mouse 13 is converted to movement of the cursor 16 on the screen 11. As shown in FIG. 3, as the mouse 13 is moved by the hand of a user from point A to point B on a surface, the mouse moves generally in a rightward and upward direction. The computer 10, under the routine 100 of the present invention, converts the mouse movement signals generated by movement of the mouse 13 from point A to point B into movement of the cursor 16 in only a horizontally rightward direction, as the routine 100 proceeds through the steps 106, 110, 112, 118, 120, 124, 128, and 116. The resultant movement of the cursor 16 (produced by moving the mouse 13 from point A to point B) is represented by the dashed vector A shown in FIG. 3. When the mouse 13 reaches point B, the absolute value of the change in the y direction (or in the y axis coordinates) exceeds the absolute value of change in the x direction (or in the x axis coordinates) by at least tenfold, and thus the computer 10 begins to move the cursor 16 vertically from point B as the routine 100 proceeds through the steps 106, 110, 112, 118, 120, 124, 126, and 116.

Following point B, the mouse 13 moves from point B to point C in a generally upward direction, and moves increasingly rightward as the mouse approaches point C. As the mouse 13 moves from point B to point C, the routine 100 proceeds through steps 106, 110, 112, 118, 120, 124, 128 and 116, causing the cursor 16 to move vertically upward. The resultant movement of the cursor 16 (produced by moving the mouse 13 from point B to point C) is represented by the dashed vector B shown in FIG. 3. At point C, the absolute value of the change in the x direction is greater than or equal to ten times the absolute value of the change in the y direction. Consequently, the routine 100 proceeds through the steps 106, 110, 112, 118, 120, 122 and 116 as the computer 10 changes the direction in which the cursor 16 moves from upward to rightward.

As the mouse 13 moves from point C to point D, the routine 100 proceeds through the steps 106, 110, 112, 118, 120, 124, 128, and 116, causing the cursor 16 to move horizontally rightward. The resultant movement of the cursor 16 (produced by moving the mouse 13 from point C to point D) is represented by the dashed vector C. The resultant or combined movement of the cursor 16 on the screen 11 is shown in FIG. 4, as the sequential movement of the cursor along the paths represented by the vectors A', B' and C'.

In an alternative embodiment, the routine 100 sets or establishes a zone within which the cursor may linearly move based upon the direction set in step 114. The zone defines a narrow vertical column parallel with the y axis or horizontal row parallel with the x axis within which the cursor may move. For example, the row could be defined as two or three rows in a spreadsheet. Mouse movement signals indicating movement of the cursor 16 in a direction perpendicular to the established zone are ignored. Only when the received mouse movement signals indicate that the cursor 16 is to be moved beyond the zone by the selected factor (e.g., 10) will a new zone be established in the perpendicular direction.

Figure 5:
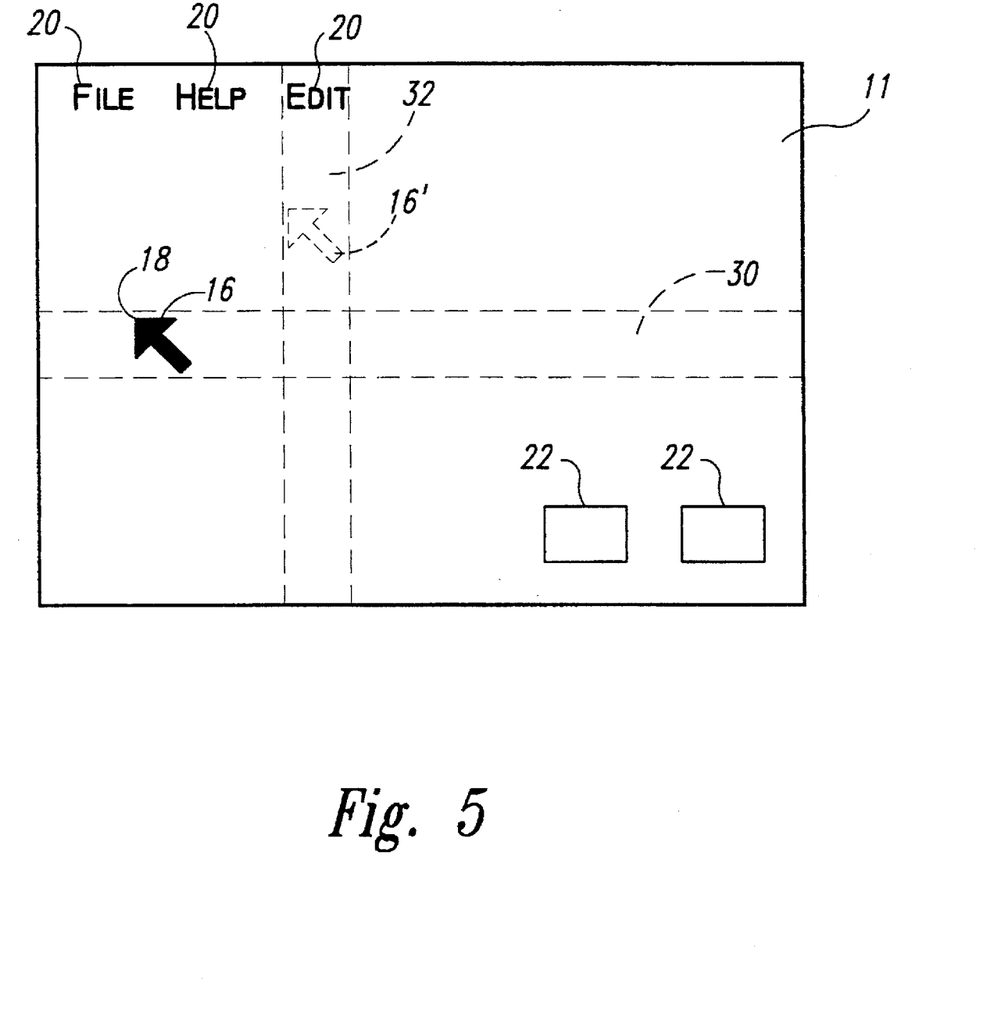
FIG. 5 is a schematic drawing of a computer screen illustrating an alternative embodiment of the present invention.

For example, as shown in FIG. 5, the cursor 16 is initially moved horizontally, and the computer 10 establishes a narrow horizontal row 30 in which the cursor will only move horizontally. If current mouse movement signals, multiplied by the factor (i.e., by ten), indicate that the cursor 16 is to be moved beyond this row (either up or down), then the computer 10 establishes a vertical column in which the cursor 16 will move vertically despite minor deviations within this column. If the cursor 16 in FIG. 5 is moved to the position indicated by a dashed cursor 16', outside of the horizontal path 30, the computer 10 establishes a narrow vertical column 32 within which the cursor may linearly move, despite small movements of the mouse 13 perpendicular to the vertical y axis.

Those skilled in the art will recognize that the above-described invention provides a method of moving a cursor or other object displayed on a computer display device along defined paths on the display device. Although specific embodiments of, and examples for, the present invention have been described for purposes of illustration, various equivalent modifications may be made without departing from the spirit and scope of the invention. For example, while the present invention has generally been described above as comparing the change in position of a cursor, the present invention could instead compare changes in velocity of the cursor. Additionally, while the present invention is described as moving a cursor in a two-dimensional plane defined by x and y axes, the present invention may be readily adapted by those skilled in the art based on the description provided herein to restrict movement of a cursor to linear paths in three-dimensional space defined by x, y and z axes. Accordingly, the present invention is not limited by the disclosure, but instead its scope is to be determined entirely by reference to the following claims.

We claim:

1. In a computer system having a computer with a display and a pointing device coupled thereto, the computer capable of producing cursor movement signals to move a cursor in x and y directions along respective x and y axes on the display device in response to signals from the pointing device, the cursor movement signals representative of x and y coordinates, a method of moving the cursor on the display device comprising the steps of:

(a) storing a first set of x and y position coordinates of the cursor corresponding to a first position of the cursor on the display device;

(b) receiving a movement signal from the pointing device corresponding to a pointing device indicated position having a second subsequent set of x and y position coordinates;

(c) comparing the first set of x and y position coordinates to the second set of x and y position coordinates to determine a first indicated change in position in the x direction and a first indicated change in position in the y direction;

(d) determining a current direction in which the cursor is to move as the x direction if the first indicated change in position in the x direction is greater than the first indicated change in position in the y direction, and as the y direction if the first indicated change in position in the y direction is greater than the first indicated change in position in the x direction;

(e) initially, linearly moving the cursor to a new position on the display device in only the current direction;

(f) storing a new set of x and y position coordinates of the cursor corresponding to the new position of the cursor on the display device;

(g) storing the current direction;

(h) receiving another movement signal from the pointing device corresponding to another pointing device indicated position having a third subsequent set of x and y position coordinates;

(i) comparing the new set of x and y position coordinates to the third set of x and y position coordinates to determine a second indicated change in position in the x direction and a second indicated change in position in the y direction;

(j) linearly moving the cursor on the display device in the current direction if the current direction is in the x direction and the second indicated change in position in the y direction is not greater than the second indicated change in the x direction multiplied by the first selected value, or the current direction is in the y direction and the second indicated change in position in the x direction is not greater than the second indicated change in the y direction multiplied by the first selected value; and (k) linearly moving the cursor on the display device in a changed direction if the current direction is in the x direction and the second indicated change in position in the y direction is greater than the second indicated change in position in the x direction multiplied by the first selected value, or if the current direction is in the y direction and second indicated change in position in the x direction is greater than the second indicated change in position in the y direction multiplied by the first selected value, movement to the changed direction occurring without additional and simultaneous user input.

2. The method of claim 1 wherein the step (c) of comparing compares the absolute value of the difference between the second x position coordinate and the first x position coordinate to the absolute value of the difference between the second y position coordinate and the first y position coordinate.

3. The method of claim 1, further comprising the step of repeating the steps (f), (g), (h), (i), (j), and (k), and wherein the step of repeating is performed after once performing the steps (a), (b), (c), (d), (e), (f) and (g), and wherein the step of steps of (i) and (k) linearly move the cursor to another new position after the steps of (a), (b), (c), (d), (e), (f) and (g) are once performed.

4. The method of claim 1 wherein the first selected value is about 10.

5. The method of claim 1, wherein the step (a) of storing the first set of x and y position coordinates includes the step of setting the previous direction in which the cursor has moved as being unknown.

6. A method of restricting movement of a cursor on a computer screen in response to movement signals, the movement signals indicating a position with respect to x and y axes, the method comprising the steps of:

storing a first position of the cursor on the computer screen, the first position having first and second coordinates corresponding to a first position with respect to the x and y axes, respectively;

storing a previous direction in which the cursor has moved on the computer screen as one of an x axis direction and a y axis direction;

receiving a movement signal indicating third and fourth coordinates corresponding to a second position with respect to the x and y axes, respectively;

comparing the first and third coordinates to produce a first value, and the second and fourth coordinates to produce a second value;

linearly moving the cursor parallel to the x axis if the first value is greater than a factor multiplied by the second value, without requiring simultaneous and additional user input;

linearly moving the cursor parallel to the y axis if the second value is greater than the factor multiplied by the first value, without requiring simultaneous and additional user input; and linearly moving the cursor in the previous direction if the first value is not greater than the factor multiplied by the second value or the second value is not greater than the factor multiplied by the first value.

7. The method of claim 6, further comprising the steps of repeating the steps of storing a first position, storing a previous direction, receiving a movement signal, comparing, linearly moving the cursor parallel to the x axis, linearly moving the cursor parallel to the y axis, and linearly moving the cursor in the previous direction.

8. The method of claim 6 wherein the x and y axes are mutually perpendicular and aligned with edges of the computer screen, and wherein the step of receiving the movement signal receives third and fourth coordinates corresponding to positions with respect to the x and y mutually perpendicular axes.

9. The method of claim 7 wherein the step of comparing includes the steps of producing a first value from the difference between the third coordinate and the first coordinate, producing the second value from the difference between the fourth coordinate and the second coordinate, and comparing the absolute value of the first value to the absolute value of the second value.

10. The method of claim 9 wherein the step of linearly moving the cursor parallel to the x axis moves the cursor in a first direction along the x axis if the first value is positive, and moves the cursor in a second direction along the x axis if the first value is negative.

11. The method of claim 9 wherein the step of linearly moving the cursor parallel to the y axis moves the cursor in a first direction along the y axis if the second value is positive, and moves the cursor in a second direction along the y axis if the second value is negative.

12. A method of restricting movement of an object displayed on a display screen, the method comprising the steps of:

receiving a first movement signal indicating a direction in which the object is to be moved on the screen, the first movement signal having a first component and a second component corresponding to a first direction and a second direction, respectively;

establishing an initial direction in which the object is to move on the screen;

receiving a second movement signal indicating another direction in which the object is to be moved on the screen, the second movement signal having the first and second components respectively corresponding to the first and second directions; and moving the object in only the initial direction on the screen unless a change between the first and second movement signals is greater than a selected amount, and then moving the object in the another direction on the screen, movement to the another direction capable of occurring without simultaneous and additional user input.

13. The method of claim 12 wherein the step of establishing an initial direction in which the object is to move includes the steps of:

comparing the first movement signal to a previous movement signal, the previous movement signal having first and second components;

determining a greater change between the first components of the first and previous movement signals and the second components of the first and previous movement signals; and determining an initial direction as corresponding to a one of the first and second components having the greater change.

14. The method of claim 13 wherein the step of moving the object in only the initial direction includes the steps of:

comparing the first components of the first and second movement signals to produce a first value and comparing the second components of the first and second movement signals to produce a second value;

comparing the first and second values to produce a component result that corresponds to the first direction if a change between the first components is greater that a change between the second components, and that corresponds to the second direction if a change between the first components is less than a change between the second components; and linearly moving the cursor in the another direction on the screen only if the component result corresponds to one of the first and second components that is different from the one of first and second components that had the greater change in the step of establishing.

15. The method of claim 12 wherein the first and second components are velocity components.

16. The method of claim 12 wherein the first and second directions are mutually perpendicular.

17. An apparatus for restricting movement of a cursor on a computer screen to first and second mutually perpendicular directions, the apparatus comprising:

a computer having a screen;

a cursor displayed on the screen;

a pointing device coupled to the computer and producing signals for indicating movement of the cursor in the first and second directions;

a converter coupled to the computer for converting the signals from the pointing device into first and second cursor movement signals that each include first and second components for indicating movement of the cursor in the respective first and second directions on the screen, the first and second cursor movement signals being temporally spaced from each other; and the computer being programmed to initially, linearly move the cursor on the screen in an initial direction corresponding to one of first and second directions based on a greater of the first and second components in the first cursor movement signal, and only changing the direction of the cursor to another direction when the first and second components of the second cursor movement signal are greater than the first and second components of the first cursor movement signal multiplied by a factor, and without additional and simultaneous user input.

18. A method of restricting movement of a cursor displayed on a display screen to movement of the cursor in only first and second mutually perpendicular directions, the method comprising the steps of:

receiving a first movement signal indicating a direction in which the cursor is to be moved on the screen, the first movement signal having first and second components corresponding to the first and second directions, respectively;

establishing a first zone on the screen in which the cursor may move linearly based on the first movement signal, the first zone being substantially parallel to one of the first and second directions;

receiving a second movement signal indicating another direction in which the cursor is to be moved on the screen, the second movement signal having first and second components corresponding to the first and second directions, respectively, the first and second components of the second movement signal differing from the first and second components of the first movement signal; and moving the cursor only within the first zone unless the first and second components of the second movement signal differ by an amount greater than a selected amount from the first and first components of the second movement signal, and then establishing a second zone in which the cursor may move without requiring simultaneous and additional user input, the second zone being substantially perpendicular to the first zone.

* * * * *